(12) United States Patent
Freson et al.

(10) Patent No.: US 7,934,919 B2
(45) Date of Patent: *May 3, 2011

(54) METHOD AND DEVICE FOR MOLDING AN OPTICAL LENS, ESPECIALLY AN OPHTHALMIC LENS

(75) Inventors: David Freson, Estrees-Deniecourt (FR); Jean-Francois Cailloux, Bussy Saint Georges (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 1237 days.

This patent is subject to a terminal disclaimer.

(21) Appl. No.: 10/558,404

(22) PCT Filed: Jun. 9, 2004

(86) PCT No.: PCT/FR2004/001433
§ 371 (c)(1),
(2), (4) Date: Nov. 28, 2005

(87) PCT Pub. No.: WO2004/110731
PCT Pub. Date: Dec. 23, 2004

(65) Prior Publication Data
US 2006/0267225 A1    Nov. 30, 2006

(30) Foreign Application Priority Data
Jun. 11, 2003   (FR) .................................... 03 06987

(51) Int. Cl.
*B29C 33/00*  (2006.01)
*B29C 33/30*  (2006.01)
*B29C 35/00*  (2006.01)
*B29C 45/00*  (2006.01)

(52) U.S. Cl. ................... 425/192 R; 425/808; 425/195; 264/1.32; 264/39; 249/102

(58) Field of Classification Search .............. 264/1.32, 264/2.1; 425/190, 406, 454.1, 195, 192, 425/808, 192 R; 249/102
See application file for complete search history.

(56) References Cited

U.S. PATENT DOCUMENTS

| | | | | |
|---|---|---|---|---|
| 2,304,664 | A | * | 12/1942 | Smith ........................... 425/423 |
| 4,190,621 | A | | 2/1980 | Greshes |
| 4,197,266 | A | * | 4/1980 | Clark et al. ..................... 264/2.2 |
| 4,372,368 | A | * | 2/1983 | Lombard ....................... 164/332 |
| 4,786,444 | A | * | 11/1988 | Hwang ......................... 264/1.38 |

(Continued)

FOREIGN PATENT DOCUMENTS

EP  0941829  * 9/1999

(Continued)

*Primary Examiner* — Kat Wyrozebski
*Assistant Examiner* — Nahida Sultana
(74) *Attorney, Agent, or Firm* — Young & Thompson

(57) ABSTRACT

A method includes the following steps: a first shell (12) is immobilized in a first shell carrier (6); a second shell (29) is immobilized in a second shell carrier (27); the first shell carrier (6) is oriented in such a way that a useful moulding surface of the first shell (12) faces upwards and forms the base of a vessel; a pre-determined quantity of polymerizable material is placed in the vessel; the first shell carrier (6) and the second shell carrier (27) are moved into a pre-determined relative position wherein the first shell (12) and the second shell (29) are in a pre-determined moulding position, by at least partially arranging the second shell (29) in the vessel, at a distance from the edges thereof. The inventive device includes a structure for positioning the shell carriers.

20 Claims, 8 Drawing Sheets

U.S. PATENT DOCUMENTS

| | | | |
|---|---|---|---|
| 4,933,119 A * | 6/1990 | Weymouth, Jr. | 264/1.1 |
| 5,137,441 A * | 8/1992 | Fogarty | 425/412 |
| 5,850,107 A * | 12/1998 | Kindt-Larsen et al. | 264/1.1 |
| 6,068,464 A * | 5/2000 | Su et al. | 425/190 |
| 6,368,096 B1 * | 4/2002 | Dobner et al. | 425/215 |
| 6,997,693 B2 * | 2/2006 | Horner et al. | 425/174.4 |
| 2004/0191353 A1 * | 9/2004 | Togo et al. | 425/412 |
| 2006/0145370 A1 * | 7/2006 | Lawton et al. | 264/1.32 |
| 2006/0202367 A1 * | 9/2006 | Knutzen et al. | 264/1.32 |
| 2008/0102151 A1 * | 5/2008 | Perez et al. | 425/408 |

FOREIGN PATENT DOCUMENTS

| | | |
|---|---|---|
| FR | 1 204 627 | 1/1960 |
| GB | 847 797 | 9/1960 |

\* cited by examiner

METHOD AND DEVICE FOR MOLDING AN OPTICAL LENS, ESPECIALLY AN OPHTHALMIC LENS

BACKGROUND OF THE INVENTION

1. Field of the Invention

The field of the invention is that of the fabrication of optical lenses, especially ophthalmic lenses intended to form spectacle lenses.

The invention more particularly concerns a flat molding method and a device for obtaining this kind of optical lens from a polymerizable material, these methods and devices involving the use of molding shells.

2. Description of the Related Art

It is known that molding shells are routinely employed in this field to form the two internal surfaces of a mold corresponding to the two faces of the finished lens that is obtained after polymerization of the material in the mold.

There are known from the document U.S. Pat. No. 4,474,355 a device and a method of molding an ophthalmic lens that employs two shells and a support for the two shells that allows them to be disposed flat and at a distance from each other to form a mold.

For positioning the shells, this support includes a series of shoulders for each shell, each shoulder being formed in an upright projecting from an annular base.

The document FR 2 449 519 also describes a device employing two molding shells. An annular seal is adapted to receive the two shells and to provide a seal between them.

Thus the annular seals form with the shells a sealed molding cavity, the elasticity of the seal enabling the latter to deform to accommodate shrinkage of the material upon polymerization.

Moreover, the document DE 2 455 888 describes a device including two sets of shells, each set including a plurality of interconnected shells disposed side by side, these two sets of shells being adapted to be superposed so that the shells cooperate two by two, each facing another to form a molding cavity.

SUMMARY OF THE INVENTION

The invention is aimed at a method and a device enabling the fabrication of such lenses to a high level of quality and in a high-throughput industrial production environment, this method and this device nevertheless being totally flexible by virtue of employing a set of removable shells.

To this end, a first aspect of the invention proposes a method of molding an optical lens, especially an ophthalmic lens, from a polymerizable material, which method uses a first molding shell and a second molding shell and holds said first and second molding shells in a predetermined molding position in which they are laid flat, and facing each other at a distance; the method is characterized in that it includes the following steps:

immobilizing the first shell in a first shell support;
immobilizing, the second shell in a second shell support;
maintaining the first shell support in an orientation in which an active molding surface of the first shell faces upward and forms the bottom of a cup;
depositing in said cup a predetermined quantity of said polymerizable material;
bringing said first shell support and said second shell support to a predetermined relative position in which the first shell and the second shell are in said predetermined molding position, in which an active molding surface of said second shell is in contact with the polymerizable material, facing the active molding surface of the first shell, with the second shell placed at least partially in the cup, at a distance from its edges.

Thus the method of the invention is of the kind employing a set of shells comprising shells with different geometries, the user selecting a first shell and a second shell that correspond to the two faces of the lens to be obtained on completion of the molding process; however, in contrast to the prior art cited above, the relative positioning of the two shells is not effected by a support or by a seal common to the two shells. The use of a separate shell support for each shell offers in particular the advantage that no joining part and no seal are necessary between the shells.

In particular this reduces the minimum thickness constraints at the edge and consequently at the center of the lens.

In a preferred embodiment, immobilizing is effected rigidly during the step of immobilizing the first shell and during the step of immobilizing the second shell and the method further includes, after the step of bringing said first shell support and said second shell support to a predetermined relative position, a step of immobilizing the first shell support and the second shell support relative to each other except for mutual closing movement.

This mutual movement toward each other, which is the only movement allowed between the two shells, is intended to accommodate shrinkage of the material as it polymerizes. In this arrangement, the shells are rigidly immobilized relative to the shell supports, i.e. with rigid material against rigid material, with no elastic means between them. Very accurate positioning of the shells is therefore obtained, and thus very accurate molding. Nevertheless, a consequence of not using intermediate elastic means is that it is not possible to rely on any material deformation property to ensure that the mold remains in contact with the material. Recourse to this feature of movement of the shells toward each other is therefore operative within this context.

According to a feature that is preferred for reasons of simplicity and convenience of implementation, said step of bringing said first shell support and said second shell support to a predetermined relative position is carried out after said step of depositing a predetermined quantity of said polymerizable material in said cup.

A second aspect of the invention consists in a device for obtaining an optical lens, especially an ophthalmic lens, from a polymerizable material, suited to implementation of the method explained above, the device comprising a first molding shell, a second molding shell and means for maintaining said first molding shell and said second molding shell in a predetermined molding position in which they are disposed flat and facing each other at a distance; which device is characterized in that said maintaining means comprise:

a first shell support adapted to immobilize the first shell in a predetermined position relative to said first shell support and to assume a working position in which an active molding surface of the first shell faces upward, the first shell and the first shell support being adapted to cooperate so that said active molding surface forms the bottom of a cup in said working position;

a second shell support adapted to immobilize said second shell in a predetermined position relative to said second shell support and to assume a working position in which an active molding surface of the second shell faces downward; the first shell, the second shell, the first shell support and the second shell support being adapted to cooperate so that, when the first shell support and the second shell support are each in the working position, said active surface of the second shell faces the active surface of the first shell, being at least partially placed in said cup, at a distance from its edges; and a structure adapted to bring said first shell support and said second shell support into respective working positions in which the first shell and the second shell are in said predetermined molding position.

According to an embodiment of the device that is preferred for the reasons explained above, the first shell support is adapted to immobilize rigidly the first shell and the second shell support is adapted to immobilize rigidly the second shell and said structure is further adapted to immobilize the first shell support and the second shell support relative to each other except for mutual closing movement.

According to preferred features of the device, the overall lateral size of the active molding surface of the second shell is less than the width of the cup so as to form, in said predetermined molding position, a supply reserve of material in the open space between the second shell and the edges of said cup.

This reserve of material provides a permanent top-up of material, provided that it has not polymerized.

According to other preferred features, the device includes an annular seal adapted to cooperate with the first shell so that, when the latter is in its predetermined position relative to the first shell support, one end of said seal is compressed against the contour of the active molding surface to provide a fluid-tightness between the seal and the first shell, said seal delimiting the edges of the cup.

Alternatively, the first shell includes a substantially cylindrical edge portion which, when the shells are in their predetermined position relative to the respective shell support, projects substantially vertically from the contour of the active molding surface in the direction of the second shell support, this edge portion delimiting the edges of the cup.

According to another preferred feature, at least one of the shell supports is connected to said structure by sliding guiding means.

According to another preferred feature, the second shell support includes means for clamping the second shell defining a predetermined position for reception of the second shell, said clamping means having, when they are associated with the second shell, an overall lateral size less than the width of the cup so that the second shell and the clamping means may be placed in the cup.

According to other preferred features, said structure includes a first plate connected to the first shell support and a second plate connected to the second shell support, said plates being adapted to be superposed so that, in this superposed position, the first shell support faces the second shell support.

The use of plates each connected to a shell support enables the movement of one plate relative to the other to be combined with the movement of each shell support relative to its respective plate. Great freedom in the positioning of the shells relative to each other is thus obtained.

Moreover, the first shell support may be slidably mobile relative to the first plate, so that the relative position of the two shells can be adjusted. Moreover, the device may further include means for driving the first shell support relative to the first plate, these means also being adapted to maintain the first shell support in a predetermined position relative to the first plate.

The device may equally include a compensation cylinder adapted to exert on the combination formed by the first shell support and the first shell a force opposite to and slightly less than the weight of said combination.

Moreover, the second shell support may be rotatably mobile relative to the second plate. Also, the device may include an angular index adapted to indicate the angular position of the second shell relative to the second plate.

Said structure may include inclination means enabling the first shell support to assume, in addition to the working position, an inclined position in which the first shell is oriented obliquely to its flat position.

These inclination means enable advantageous deposition of the polymerizable material into the cup.

According to a preferred feature, the first shell support includes a rigid annular seat adapted to receive the first shell and defining said predetermined position of the first shell relative to the first shell support. Also, the device may include a locking cylinder adapted to urge the first shell against said annular seat.

The annular seat and the locking cylinder guarantee optimum positioning of the first shell relative to the first shell support.

BRIEF DESCRIPTION OF THE DRAWING FIGURES

The description of the invention continues next with the following description of a preferred embodiment, which is given by way of illustrative and nonlimiting example and with reference to the appended drawings. In the latter:

DETAILED DESCRIPTION OF THE INVENTION

Figure 1:
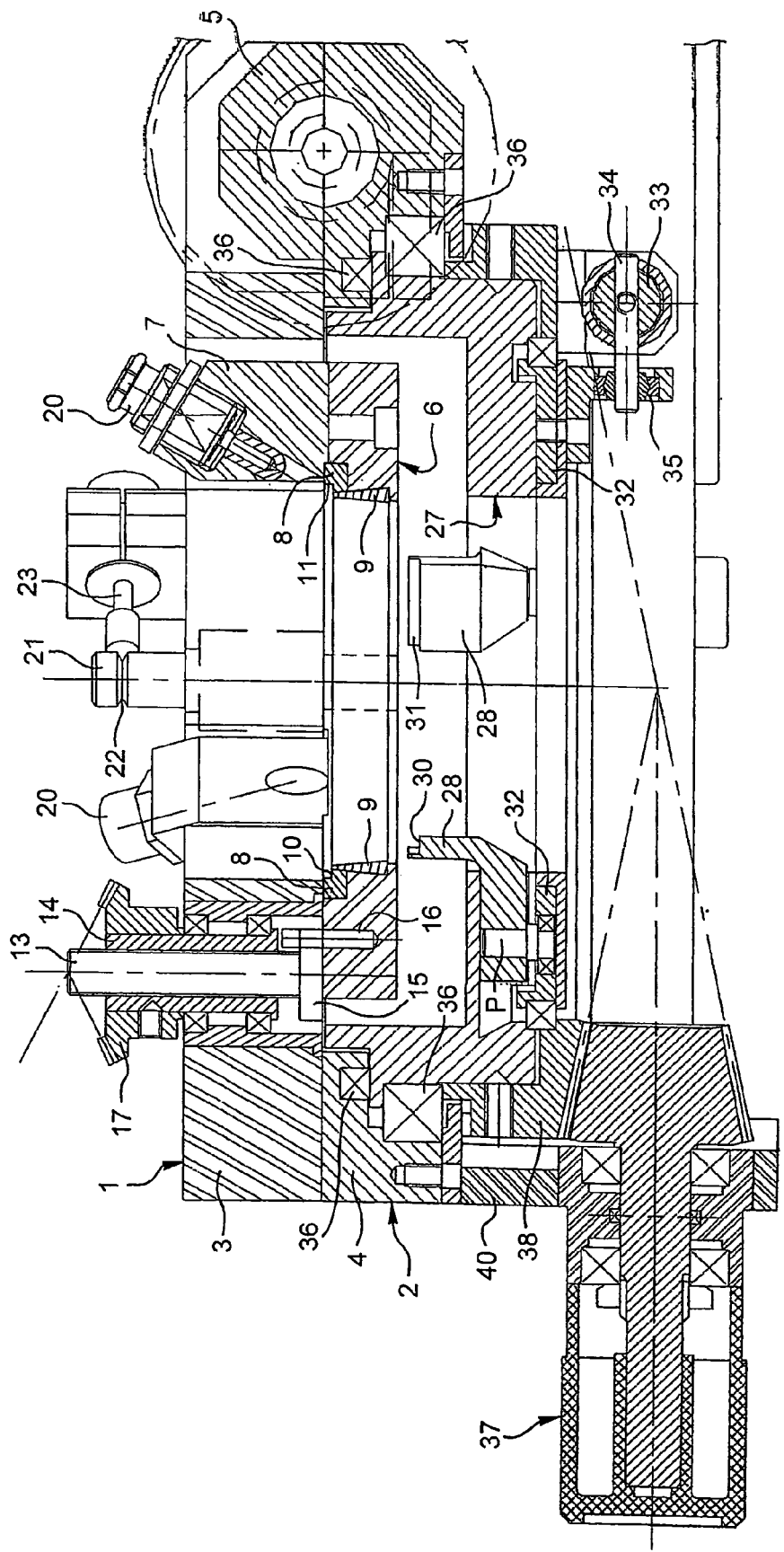
FIG. 1 is a part-sectional elevation view of a machine including shell supports of a device of the invention and a structure for driving diverse predetermined movements of those shell supports, which machine is shown in a rest position in which it is ready to receive a first shell.

FIGS. 1 to 6 show a molding device of the invention including a first plate 1 and a second plate 2 articulated to each other.

Each plate 1 and 2 includes a respective body 3 and 4 in which a central opening is formed. The two plates 1, 2 are articulated by means of a hinge 5 to enable the assembly formed by the two plates 1, 2 to fold up on itself in a first configuration (see FIG. 1), in which the first plate 1 is on top of the second plate 2, to open up like a book (see FIGS. 3 and 4 which respectively show the first plate 1 disposed to the right of the hinge 5 and the second plate disposed to the left of the hinge 5) or to fold on itself in a second configuration (see FIG. 5), in which the second plate 2 is on top of the first plate 1.

Figure 2:
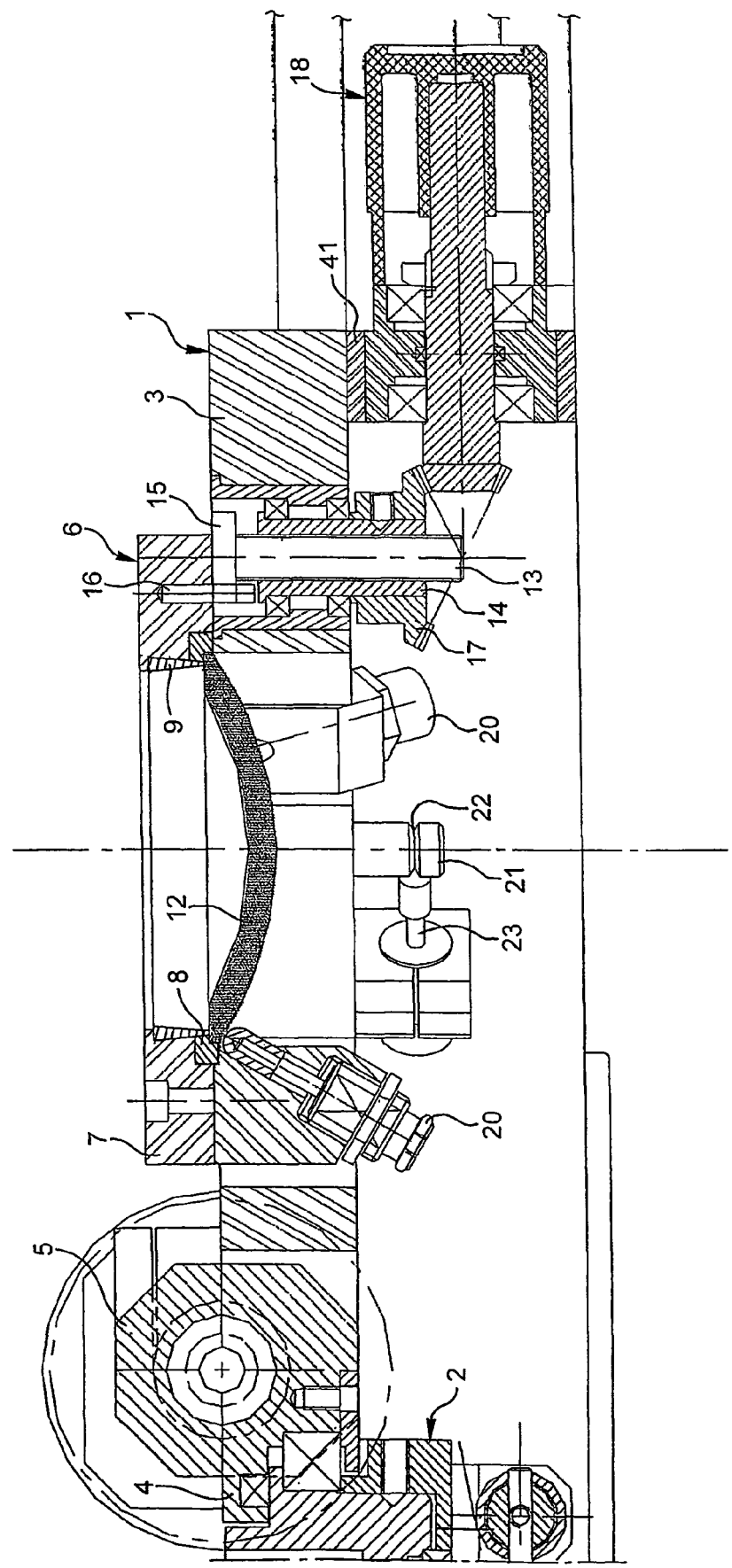
FIG. 2 is a view similar to FIG. 1, but the portion of the machine shown is that to the right (and not to the left) of the articulation axis along a transverse axis of the shell supports, a first shell being shown in place in a first shell support, the latter having pivoted one half-turn about the above transverse axis relative to its position shown in FIG. 1.

On the first plate 1, shown in FIG. 2, the device further includes a first shell support 6 that includes a body 7 having a central opening that is positioned facing the central opening of the first plate 1.

The first shell support 6 further includes an annular seat 8 force-fitted into the body 3 and surrounding said central opening and an annular seal 9 attached to the body 7 so that, in the absence of any applied force, it is positioned against an internal surface of the seat 8.

It will be noted that the seat 8 includes a circular machined portion defining two surfaces 10, 11 (see FIG. 1) for positioning a first shell 12, the annular seal 9 being flush with one of said positioning surfaces 10, namely the surface that is horizontal when the first plate 1 is in the position shown in FIG. 1 (in the remainder of the present description, the terms "horizontal" and "vertical" refer to the orientations shown in FIGS. 1 to 6).

The first shell support 6 is disposed in the central opening of the first plate 1 and is mounted on a set of slides 42 (see FIGS. 7 and 8) allowing vertical movement in translation of the first shell support 6 relative to the first plate 1.

This movement in translation is driven by a system comprising a screw 13 and a nut 14. This screw 13 has a head 15 bearing on a surface of the first shell support 6 so as to be able to raise the latter, the head 15 being prevented from rotating by a lug 16.

It will be noted that the lug 16 merely prevents rotation and does not impede movement of the shell support 6 in the vertical direction away from the head 15 and consequently from the first plate 1.

The nut 14 is mounted on the first plate 1 in rolling bearings so as to be able to turn freely to cause the screw 13 to ascend or descend.

This nut 14 is driven in rotation by a gear system 17 with concurrent axes enabling the nut 14 to be rotated manually by a knob 18.

A very accurate vertical position of the first shell support 6 relative to the first plate 1 is obtained in this way.

Figure 7:
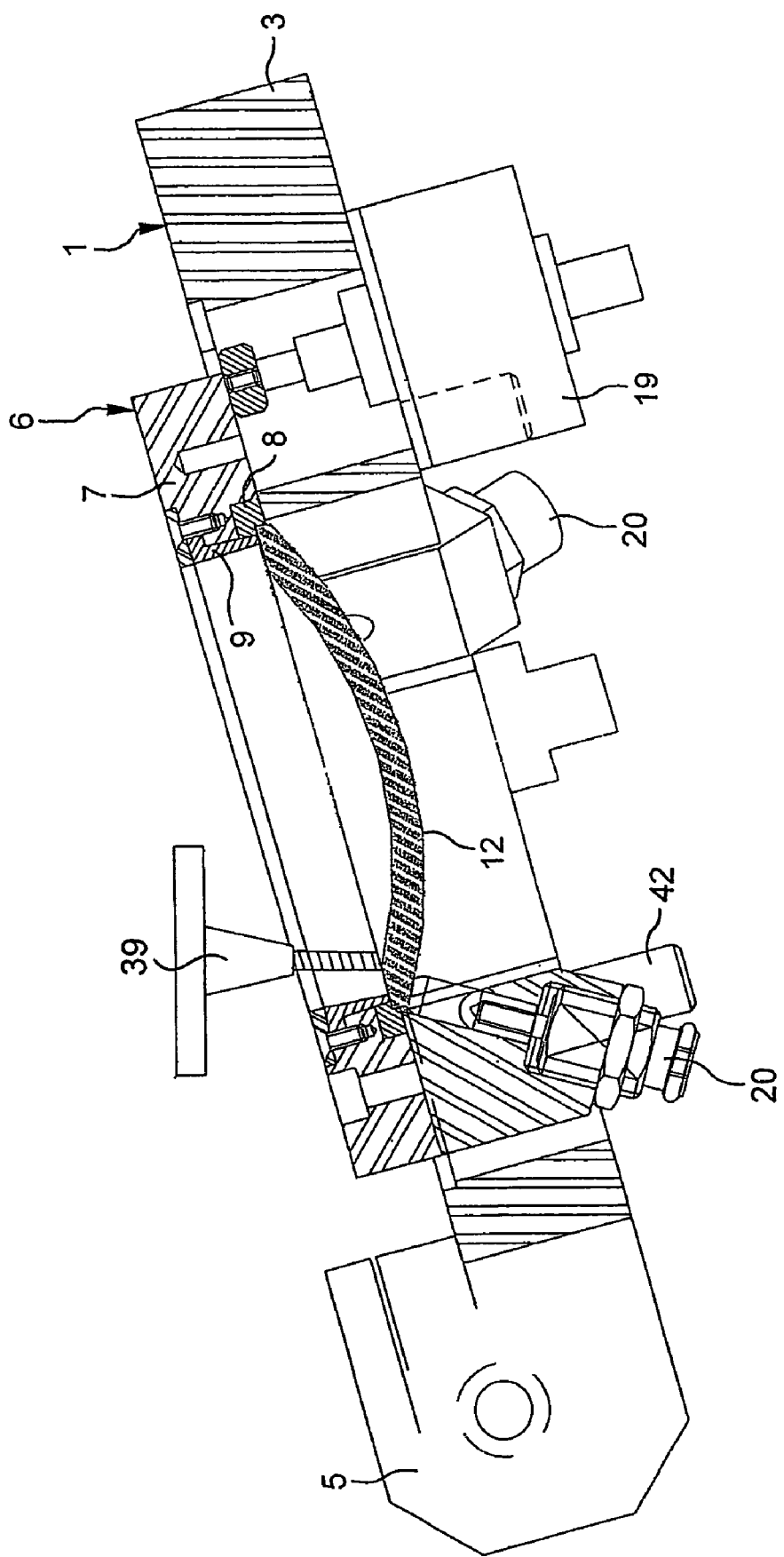
FIG. 7 is a view similar to FIG. 2, for a different embodiment of the machine and for a different method of filling the cup formed by the first shell and the annular seal.

Alternatively, the movement in translation of the first shell support 6 may be driven by a servomotor or a servocontrolled cylinder 19 (see FIG. 7).

Figure 5:
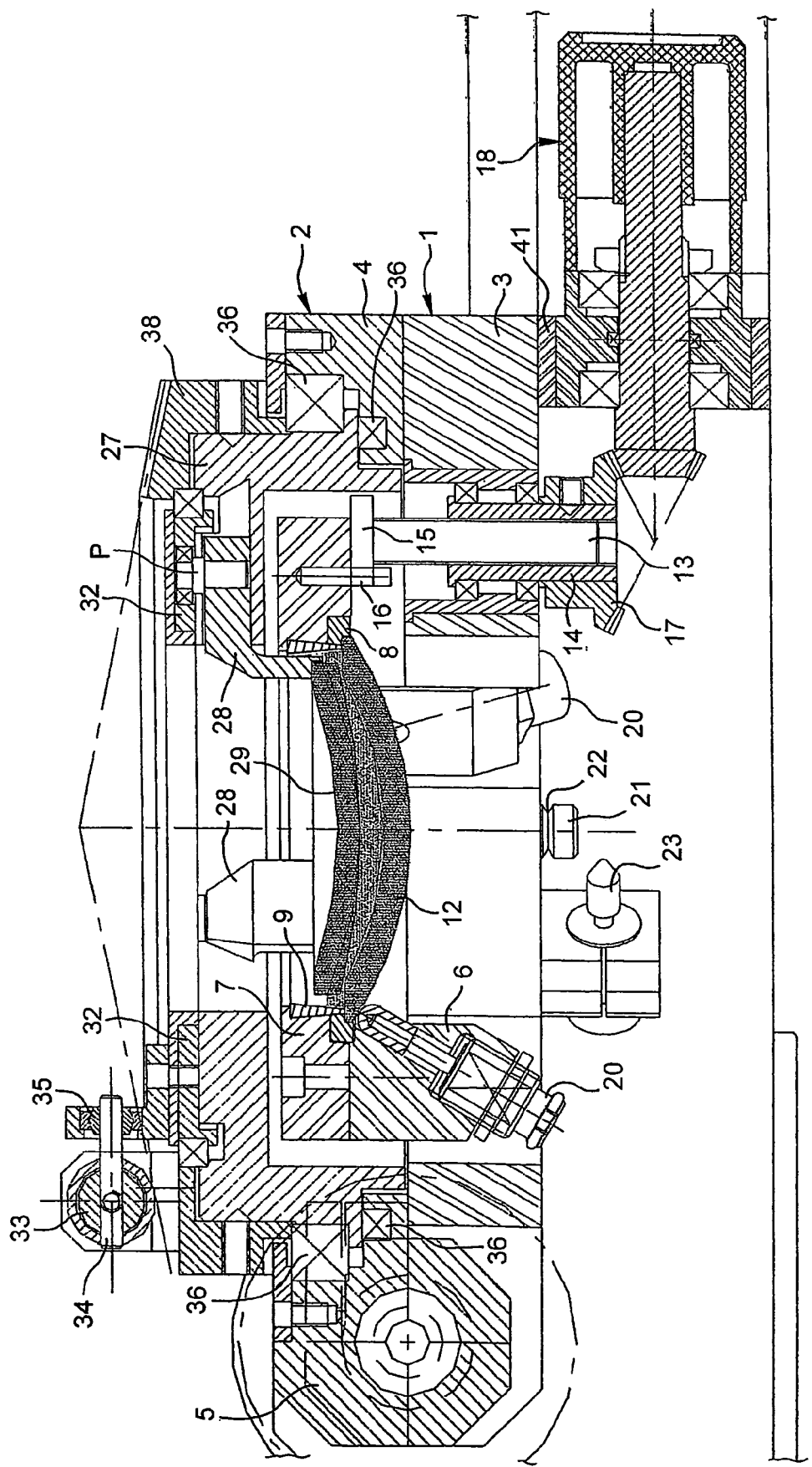
FIG. 5 is a view similar to FIG. 3 in a configuration of the machine in which the second shell support has pivoted one half-turn relative to its position shown in FIG. 4 and the relative position of the first shell support and the second shell support has been adjusted so that the respective facing surfaces of the first shell and the second shell have the required relative position.

The first shell support 6 can therefore assume a position in which it bears against the first plate 1 (FIG. 2) and a plurality of positions in which the first shell support is at a distance from the first plate 1 controlled by the knob 18 or the cylinder 19 (FIG. 5).

As described above, the annular seat 8 is intended to receive and position the first shell 12. To this end the first shell support 6 includes three clamping cylinders 20 (only two of these cylinders are visible in the figures, in section) regularly disposed at 120° around the seat 8 and disposed obliquely so that their piston rods are able to urge the first shell 12 against the seat 8 (FIGS. 2, 3, 4 and 5) after deformation of the seal 9.

When the first plate 1 is in the FIG. 2 position, the first shell support 6 rests under its own weight on the head 15 of the screw 13.

Conversely, when the first plate 1 is in the FIG. 1 position (i.e. turned over relative to the FIG. 2 position), its own weight tends to move the first shell support 6 away from the first plate 1. To prevent this, and to guarantee that the first shell support 6 and the first plate 1 remain pressed together even during pivoting of the first plate 1 about the axis of the hinge 5, the molding device includes stop means consisting here of a rod (slide) 21 projecting from the first shell support 6 and having at its end a groove 22, together with a cylinder 23 having a conical end-piece adapted to immobilize the rod 21 by means of its groove 22 (FIG. 1).

This locking position of the stop means corresponds to a stable position in which the first shell support 6 is pressed against the first plate 1.

Figure 8:
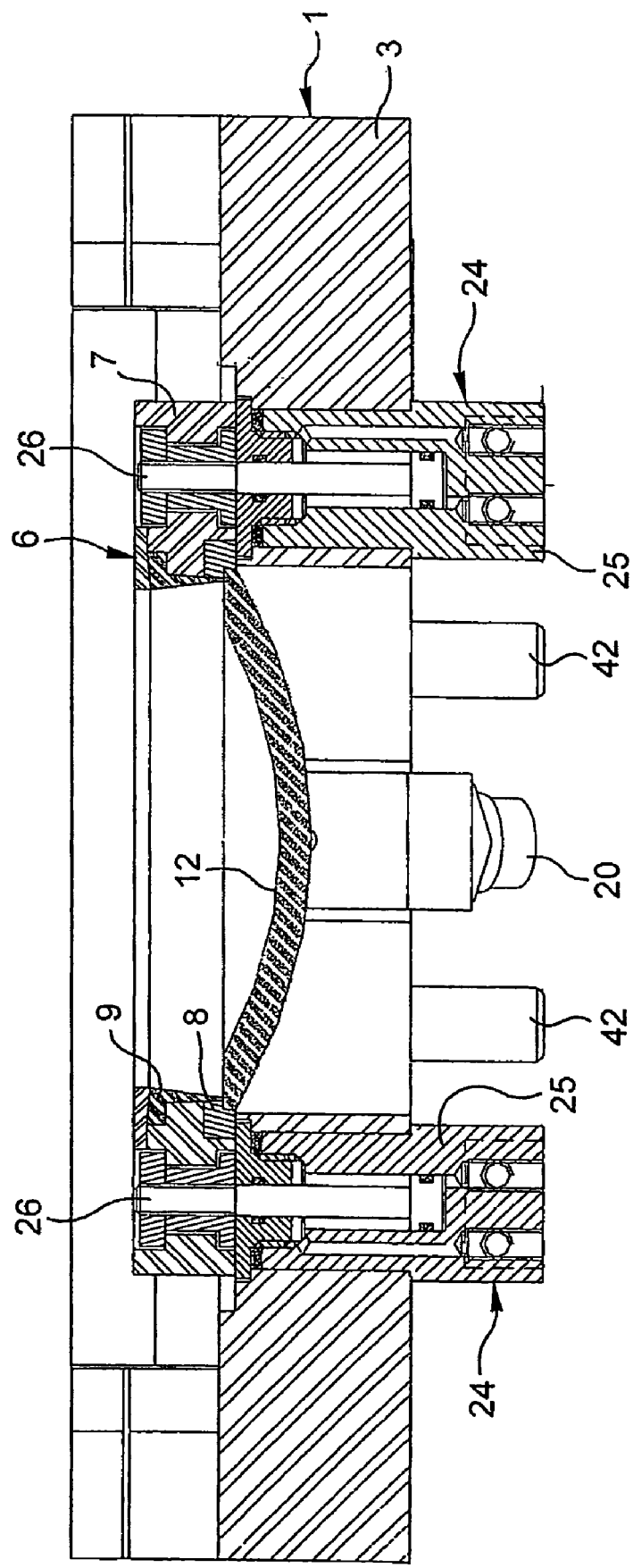
FIG. 8 is another view of this embodiment of the machine in section in a plane transverse to the section plane of FIG. 7.

In a variant shown in FIG. 8, these stop means consist of two double-acting cylinders 24; the body 25 of each cylinder 24 is fastened to the first plate 1 and the rod 26 of each cylinder 24 is fastened to the first shell support 6. These cylinders may be pressurized in the conventional way to position the first shell support 6 against the first plate 1, in this instance by establishing communication of the smaller section chamber of these cylinders with the pressure source and of the larger section chamber with a return line at atmospheric pressure.

These cylinders may equally be pressurized in the larger section chamber to exercise a compensation cylinder function described hereinafter.

In so far as the second plate 2 (visible more particularly in FIG. 4) is concerned, the latter also includes a body 4 in which is formed a central opening occupied by a second shell support 27, the second shell support 27 itself including a central opening facing the central opening of the body 4, so that the second shell support 27 is open throughout its thickness.

The second shell support 27 includes a set of three concentric clamping jaws 28 for clamping and positioning a second shell 29, positioning being effected, as for the first shell support 6, by machining the jaws 28 to define on each of them two orthogonal surfaces 30, 31 (see FIG. 1). It will be noted that when the plates 1 and 2 are facing each other (to the right or to the left of the hinge 5), the surfaces 10 and 30 are parallel and the surfaces 11 and 31 are concentric.

Here the concentric clamping of these jaws 28 is obtained in a manner that is known in the art by a cam ring 32 adapted, when it rotates about the central opening, to displace radially three pins P each attached to one of the jaws 28.

The cam ring 32 is rotated by a cylinder 33 adapted to move a rod 34 attached to the cam ring 32 by a ball-joint 35 perpendicularly to the plane of the drawing.

The second shell support 27 is mounted on rolling bearings 36 so that it can turn relative to the body 4 about the vertical axis about which the jaws 28 are concentric.

The second shell support 27 may be rotated relative to the second plate 2 by a knob 37 attached to the body 4 and which meshes with a conical gear 38 attached to the second shell support 27.

The angular position of the second shell 29 about the vertical axis passing through its center (the center of concentricity of the jaws 28) can therefore be accurately adjusted using the knob 37 (which may be replaced by a servomotor to automate this task).

The molding device as a whole is retained within a production machine by the hinge-pin of the hinge 5. Abutments 40, 41 define horizontal rest positions of the first plate 1 to the right of the hinge 5 and of the second plate 2 to the left of the hinge 5.

The pivoting of the plates 1, 2 about the hinge 5, which is held fixed, is motorized, for example by respective gears turning about the axis of the hinge 5, each of the plates 1, 2 being rotationally coupled to one of said gears.

Moreover, control means are provided for controlling the various members of the molding device that may be actuated automatically.

For example, a programmable automaton or a microprocessor executing an appropriate program actuates in a precise order the pivoting of the two plates 1, 2, the movement of the concentric jaws 28, the movement in translation of the first shell support 6 relative to the first plate 1 (in the situation in which a cylinder 19 is provided, as in FIG. 7), and the driving of the clamping cylinders 20 and, where applicable, of the double-acting cylinders 24.

The control means are also adapted to control any supplementary holding, polymerizable material deposition or polymerization devices, as described hereinafter.

The molding device that has just been described operates in the manner indicated hereinafter.

The initial configuration of the device is that of FIG. 1, with the two plates 1, 2 superposed to the right of the hinge 5.

The first shell 12 is then loaded onto the first plate 1 from above with the stop means 21, 22, 23 (or the double-acting locking/compensation cylinders 24) in the position in which they hold the first shell support 6 against the first plate 1. This first shell 12 is moved by any form of holding means, for example a sucker, with its concave side facing downward, i.e. toward the second plate 2, and positioned in the annular seat 8, with the clamping cylinders 20 retracted.

Thus the first shell 12 rests under its own weight on the positioning surface 10 and is positioned laterally by the positioning surface 11.

The clamping cylinders 20 are then deployed and kept pressurized so that their rods immobilize the edges of the first shell 12 against the annular seat 8, thereby deforming the seal 9.

The first shell 12 having been positioned, the first plate 1 is pivoted to place it to the right of the hinge 5 (see FIG. 2).

It will be noted that in this position the annular seal 9 is compressed against the first shell 12 so that the junction between the seal 9 and the first shell 12 is sealed and the concave face of the first shell 12, which here must be used for molding, cooperates with the seat 8 and the seal 9 to form a cup whose bottom faces upward (FIG. 2).

A quantity of polymerizable material predetermined as a function of the volume to be molded is then deposited in the cup formed in this way, either manually or by an appropriate deposition device such as a metering valve.

Figure 3:
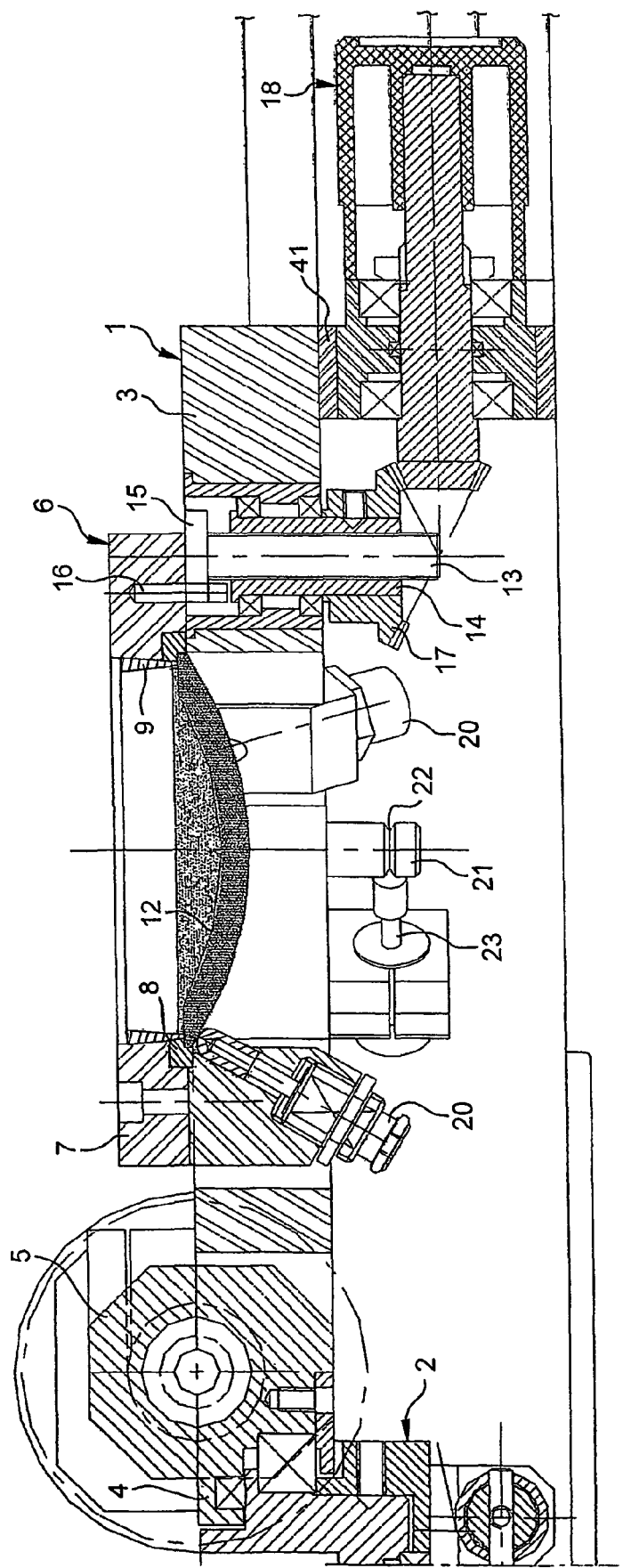
FIG. 3 is a view similar to FIG. 2, but in which the cup formed by the first shell and the annular seal has been filled with polymerizable material.

FIG. 3 shows the first plate 1 after the deposition of the material.

Figure 4:
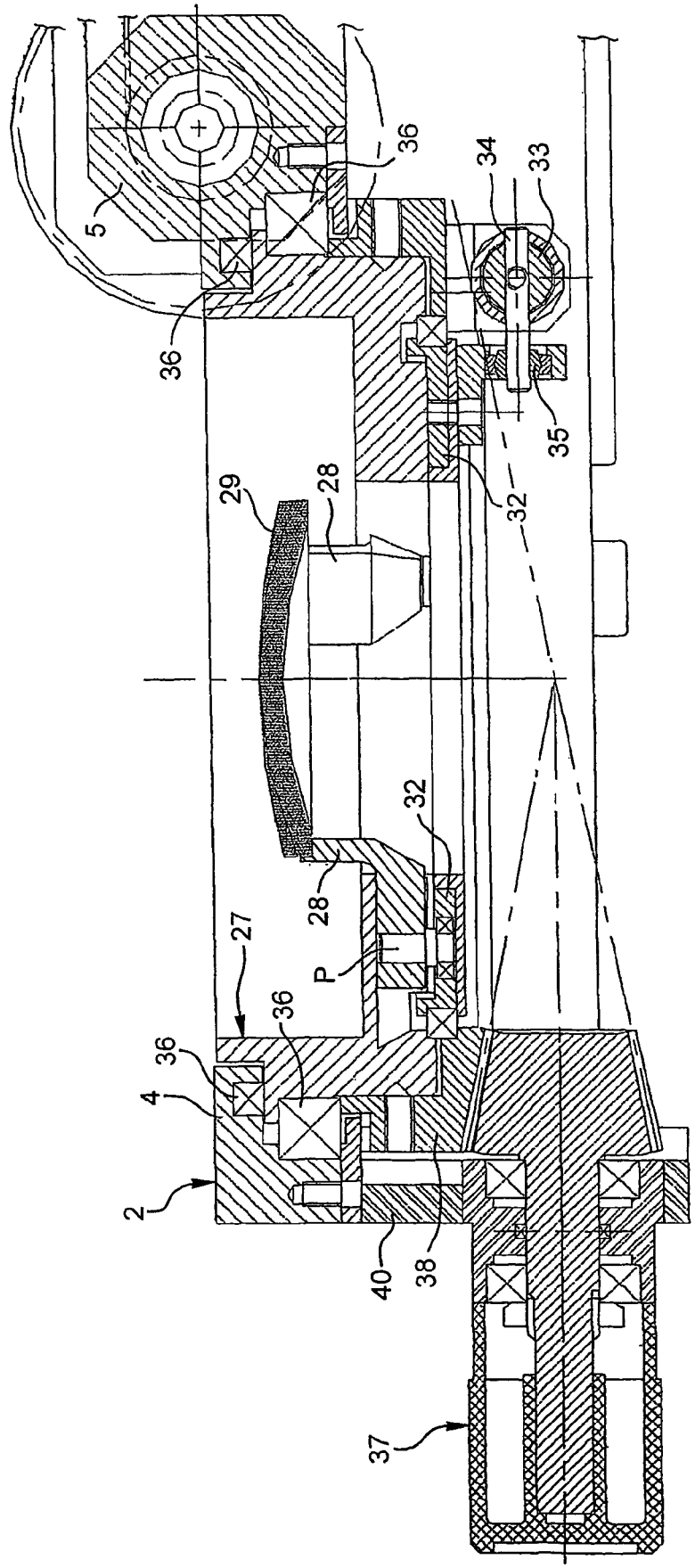
FIG. 4 is a view similar to FIG. 1, contemporaneous with FIG. 3, but for the portion of the machine to the left of the transverse articulation axis, with a second shell placed in the second shell support.

Because the respective right-hand and left-hand portions of the device shown in FIGS. 3 and 4 correspond to the same position, the operation shown in FIG. 4 may be effected simultaneously with the deposition of material just described. Carrying out this operation in "masked" time improves productivity. The second shell 29 is placed from above, where applicable by the same holding means as the first shell 12, and is positioned and clamped by the jaws 28, with its molding face, which here is its convex face, facing upward (FIG. 4).

If the second shell 29 is intended for molding a lens for correcting astigmatism, once the second shell 29 has been clamped, it may be necessary to adjust its angular position about a vertical axis using the knob 37.

The second plate 2 is then pivoted to superpose it on the first plate 1 to the right of the hinge 5.

The second shell 29 is then facing and at a distance from the cup formed by the first shell 12.

The stop means 21, 22, 23 (or the cylinders 24) being inhibited, the first shell support 6 is lifted off the first plate by the action of the knob 18 or the servocontrolled cylinder 19 so that the first shell 12 brings the polymerizable material into contact with the second shell 29, as shown in FIG. 5.

It will be noted that a reserve of material is provided by the surplus material at the periphery of the active concave surface of the first shell 12.

The first and second shells 12, 29 being in a predetermined position relative to the device, the raising of the first shell support 6 may be controlled so that the distance between the two shells 12, 29 corresponds precisely to the required mold dimensions.

A phase of polymerization of the material then follows. For this, projection means, for example ultraviolet ray projection means, are positioned above and below the assembly formed by the two shells 12, 29 and the material.

The shells 12, 29 are advantageously transparent and the central openings of the plates 1, 2 and of the shell supports 6, 27 provide a large aperture for the rays, to guarantee effective polymerization.

Moreover, the molding device is designed to accommodate shrinkage of the material during polymerization. Occupying less volume as it polymerizes, the material exerts an attraction force on the molding surfaces of the shells 12, 29.

The first shell support 6 simply resting on the head 15 of the screw 13 (or on the rod of the cylinder 19) by virtue of its own weight, this attraction force can be exploited to lift the first shell support 6 so that the first shell 12 and the second shell 29 remain pressed against the material during shrinkage, which prevents separation of the shells and the material.

The FIG. 8 cylinders 24 may additionally operate as compensation cylinders to facilitate the movement of the shells toward each other. The larger section chambers of these cylinders 24 are then pressurized so that the cylinders 24 exert on the first shell support 6 an upward vertical force the intensity whereof is slightly less than the weight of the first shell support 6 and the smaller section chambers are connected to a return line that is vented to atmospheric pressure.

After polymerization, the shells 12, 29 and the solidified material form a rigid block.

The concentric jaws 28 are then loosened, the second plate 2 is pivoted toward its initial position and the first shell support 6 is returned to and locked against the first plate 1.

Figure 6:
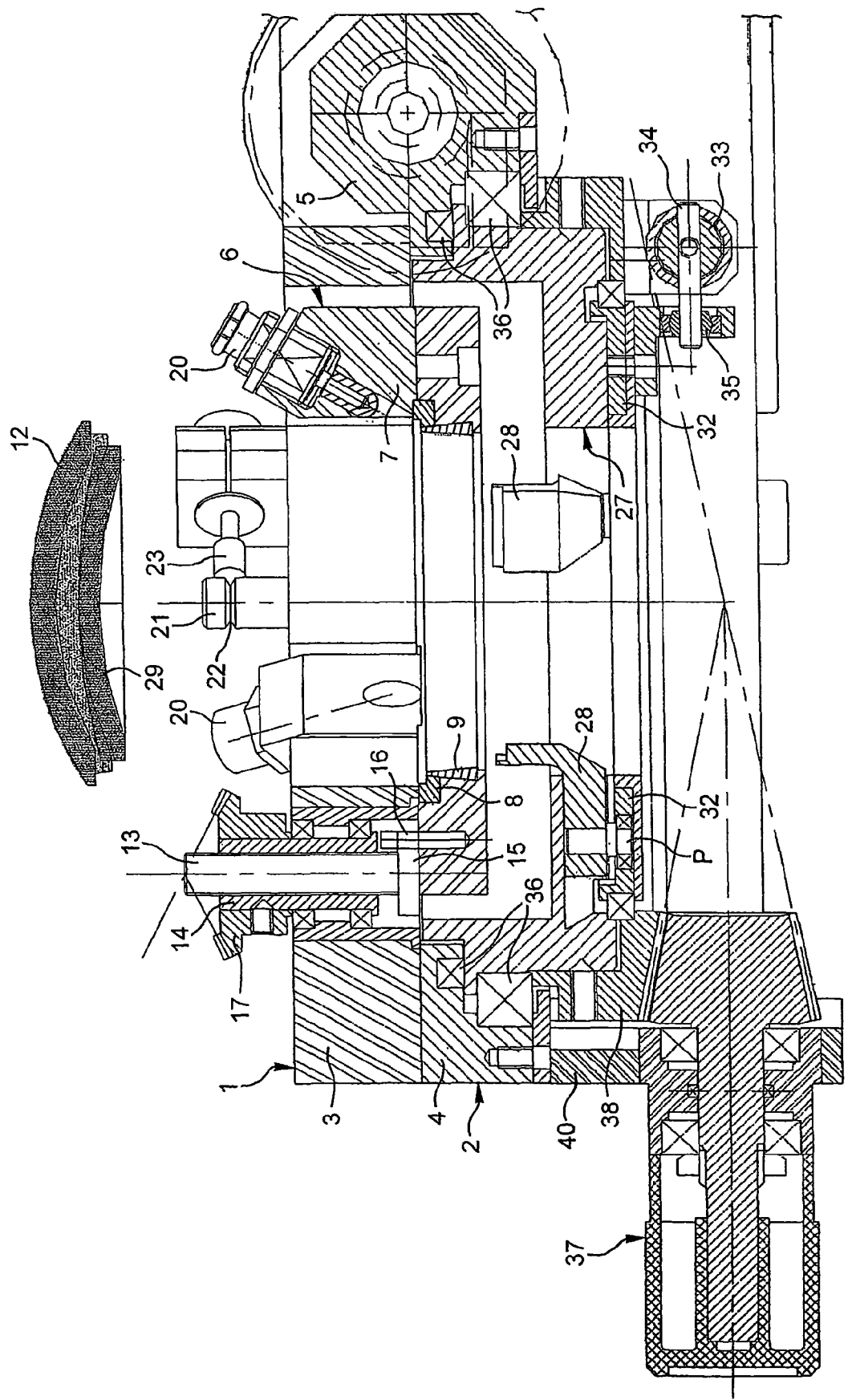
FIG. 6 is a view similar to FIG. 1, again showing the machine in the rest configuration and showing, during its evacuation from the machine, the combination formed by the first shell, the second shell and the pre-polymerized material.

The first plate 1 is then also pivoted toward its initial position, as shown in FIG. 6, and after retraction of the clamping cylinders 20, the block formed of the shells 12, 29 and the solidified material is then removed in the upward direction, where applicable by the same holding means as position the shells 12, 29.

In the variant including the servocontrolled cylinder 19 and the cylinders 24, after loosening the jaws 28, the operation of moving the shell support 6 onto and locking it to the first plate 1 and the operation of pivoting this first plate 1 toward its initial position can be effected in parallel.

The ophthalmic lens molded and polymerized in the above manner can then undergo consecutive other processing steps in which it is removed from the mold and prepared for mounting on a support such as a spectacle frame.

FIG. 7 shows a variant of the step of depositing polymerizable material in the cup formed by the first shell 12 and the first shell support 6. It shows diagrammatically a material deposition nozzle 39. The first plate 1 is inclined, unlike the plate used in the step described above.

The nozzle 39 first deposits a bead of material onto an edge of the first shell 12; as the cup is filled, the first plate 1 returns to its horizontal position, until the FIG. 3 situation is obtained.

This variant minimizes defects caused by impact of the material against the first shell 12 during expulsion.

Moreover, the first plate 1 may equally well remain inclined for subsequent steps, instead of returning to the FIG. 3 horizontal position as filling proceeds. The second plate 2 will then be superposed on the first plate 1 so as to be inclined itself, which enables the second shell 29 to come into contact with the material from an edge rather than the center during the step of movement toward each other of the first shell 12 and the second shell 29.

Different embodiments of the device may be envisaged that do not depart from the scope of the invention. Likewise, the molding of other types of optical lenses may be envisaged, for example binocular lenses or the like.

The invention claimed is:

1. A method of molding an optical lens, especially an ophthalmic lens, from a polymerizable material, which method uses a first molding shell (12) and a second molding shell (29) and holds said first and second molding shells (12, 29) in a predetermined molding position in which they are laid flat and facing each other at a distance; the method comprising the following steps:
    immobilizing the first shell (12) in a first shell support (6);
    immobilizing the second shell (29) in a second shell support (27);
    maintaining the first shell support (6) in an orientation in which an active molding surface of the first shell (12) faces upward with the first shell support (6) and the first shell (12) selected so that the active molding surface forms a bottom of a cup having edges delimited by a substantially cylindrical edge portion;
    depositing in said cup a predetermined quantity of said polymerizable material;
    after said step of depositing a predetermined quantity of said polymerizable material in said cup, bringing said first shell support (6) and said second shell support (27) to a predetermined relative position in which the first shell (12) and the second shell (29) are in said predetermined molding position, in which an active molding surface of said second shell (29) is in contact with the polymerizable material, facing the active molding surface of the first shell (12), with the second shell (29) placed at least partially in the cup, at a distance from its edges.

2. The method according to claim 1, wherein the immobilizing is effected rigidly during the step of immobilizing the first shell (12) and during the step of immobilizing the second shell (29) and in that the method further includes, after the step of bringing said first shell support (6) and said second shell support (27) to a predetermined relative position, a step of immobilizing the first shell support (6) and the second shell support (27) relative to each other except for mutual closing movement.

3. A device for obtaining an optical lens, especially an ophthalmic lens, from a polymerizable material, the device comprising:
    a first molding shell (12);
    a second molding shell (29); and
    means for maintaining said first molding shell (12) and said second molding shell (29) in a predetermined molding position in which they are disposed flat and facing each other at a distance, the means for maintaining comprising:
        a first shell support (6) adapted to immobilize the first shell (12) in a predetermined position relative to said first shell support (6) and to assume a working position in which an active molding surface of the first shell (12) faces upward, the first shell (12) and the first shell support (6) being adapted to cooperate so that said active molding surface forms a bottom of a cup having edges delimited by a substantially cylindrical edge portion in said working position;
        a second shell support (27) adapted to immobilize said second shell (29) in a predetermined position relative to said second shell support (27) and to assume a working position in which an active molding surface of the second shell (29) faces downward; the first shell (12), the second shell (29), the first shell support (6) and the second shell support (27) being adapted to cooperate so that, when the first shell support (6) and the second shell support (27) are each in the working position, said active surface of the second shell (29) faces the active surface of the first shell (12), being at least partially placed in said cup, at a distance from its edges; and
        a structure (1, 2) adapted to bring said first shell support (6) and said second shell support (27) into respective working positions in which the first shell (12) and the second shell (29) are in said predetermined molding position.

4. The device according to claim 3, wherein the first shell support (6) is adapted to immobilize rigidly the first shell (12) and the second shell support (27) is adapted to immobilize rigidly the second shell (29) and in that said structure (1, 2) is further adapted to immobilize the first shell support (6) and the second shell support (27) relative to each other except for mutual closing movement.

5. The device according to claim 3, wherein an overall lateral size of the active molding surface of the second shell (29) is less than a width of the cup so as to form, in said predetermined molding position, a supply reserve of material in the open space between the second shell (29) and the edges of said cup.

6. The device according to claim 3, wherein the device includes an annular seal (9) adapted to cooperate with the first shell (12) so that, when the latter is in its predetermined position relative to the first shell support (6), one end of said seal (9) is compressed against the contour of the active molding surface to provide a fluid-tightness between the seal (9) and the first shell (12), said seal (9) delimiting the edges of the cup.

7. The device according to claim 3, wherein the first shell (12) that includes the substantially cylindrical edge portion is configured so that when the shells (12, 29) are in their predetermined position relative to the respective shell support (6; 27), the first shell projects substantially vertically from the contour of the active molding surface in the direction of the second shell support (27), this edge portion delimiting the edges of the cup.

8. The device according to claim 3, wherein at least one of the shell supports (6; 27) is connected to said structure (1, 2) by sliding guiding means.

9. The device according to claim 3, wherein the second shell support (27) includes means (28) for clamping the second shell (29) defining a predetermined position for reception of the second shell (29), said clamping means (28) having, when they are associated with the second shell (29), an overall lateral size less than the width of the cup so that the second shell (29) gripped by the clamping means (28) may be placed in the cup.

10. The device according to claim 3, wherein said structure includes a first plate (1) connected to the first shell support (6) and a second plate (2) connected to the second shell support (27), said plates (1, 2) being adapted to be superposed so that, in this superposed position, the first shell support (6) faces the second shell support (27).

11. The device according to claim 3, wherein the first shell support (6) is slidably mobile relative to the first plate (1).

12. The device according to claim 11, wherein the device further includes means (13, 14, 17) for driving the first shell support (6) relative to the first plate (1) and for maintaining the first shell support (6) in a predetermined position relative to the first plate (1).

13. The device according to claim 11, wherein the device further includes a compensation cylinder (24) adapted to exert on the combination formed by the first shell support (6) and the first shell (12) a force opposite to and slightly less than the weight of said combination.

14. The device according to claim 10, wherein the second shell support (27) is rotatably mobile relative to the second plate (2).

15. The device according to claim 14, wherein the device includes an angular index adapted to indicate the angular position of the second shell (29) relative to the second plate (2).

16. The device according to claim 10, wherein said structure includes inclination means enabling the first shell support (6) to assume, in addition to the working position, an inclined position in which the first shell (12) is oriented obliquely to its flat position.

17. The device according to claim 3, wherein the first shell support (6) includes a rigid annular seat (8) adapted to receive the first shell (12) and defining said predetermined position of the first shell (12) relative to the first shell support (6).

18. The device according to claim 17, wherein the device includes a locking cylinder (20) adapted to urge the first shell (12) against said annular seat (8).

19. A device for obtaining an optical lens, especially an ophthalmic lens, from a polymerizable material, the device comprising:
- a first molding shell (12);
- a second molding shell (29); and
- a device configured for maintaining said first molding shell (12) and said second molding shell (29) in a predetermined molding position in which they are disposed flat and facing each other at a distance, the device configured for maintaining comprising:
  - a first shell support (6) adapted to immobilize the first shell (12) in a predetermined position relative to said first shell support (6) and to assume a working position in which an active molding surface of the first shell (12) faces upward, the first shell (12) and the first shell support (6) being adapted to cooperate so that said active molding surface forms a bottom of a cup having edges delimited by a substantially cylindrical edge portion in each working position;
  - a second shell support (27) adapted to immobilize said second shell (29) in a predetermined position relative to said second shell support (27) and to assume a working position in which an active molding surface of the second shell (29) faces downward; the first shell (12), the second shell (29), the first shell support (6) and the second shell support (27) being adapted to cooperate so that, when the first shell support (6) and the second shell support (27) are each in the working position, said active surface of the second shell (29) faces the active surface of the first shell (12), being at least partially placed in said cup, at a distance from its edges; and
  - a structure (1, 2) adapted to bring said first shell support (6) and said second shell support (27) into respective working positions in which the first shell (12) and the second shell (29) are in said predetermined molding position.

20. The device according to claim 4, wherein the overall lateral size of the active molding surface of the second shell (29) is less than the width of the cup so as to form, in said predetermined molding position, a supply reserve of material in the open space between the second shell (29) and the edges of said cup.

\* \* \* \* \*